US012558948B2

(12) United States Patent
Apone et al.

(10) Patent No.: US 12,558,948 B2
(45) Date of Patent: Feb. 24, 2026

(54) VEHICLE FLOOR CONSOLIDATION WITH A SHEAR PANEL OF A RECHARGEABLE ENERGY STORAGE SYSTEM

(71) Applicant: GM GLOBAL TECHNOLOGY OPERATIONS LLC, Detroit, MI (US)

(72) Inventors: Michael Apone, Macomb, MI (US); Andrew Clay Bobel, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 18/452,600

(22) Filed: Aug. 21, 2023

(65) Prior Publication Data

US 2025/0065704 A1      Feb. 27, 2025

(51) Int. Cl.
    B60K 1/04 (2019.01)
    B62D 25/20 (2006.01)

(52) U.S. Cl.
    CPC ................ B60K 1/04 (2013.01); B62D 25/20 (2013.01); *B60K 2001/0438* (2013.01)

(58) Field of Classification Search
    CPC ... B60K 1/04; B60K 2001/0438; B62D 25/20
    See application file for complete search history.

(56) References Cited

U.S. PATENT DOCUMENTS

| | | |
|---|---|---|
| 4,631,891 A | 12/1986 | Donavich |
| 9,283,895 B2 | 3/2016 | Sumi et al. |
| 10,549,795 B2 | 2/2020 | Ehrlich |
| 10,886,513 B2 | 1/2021 | Stephens |
| 11,370,287 B2 | 6/2022 | Tsuyuzaki |
| 11,462,793 B2 | 10/2022 | Kagami et al. |

(Continued)

FOREIGN PATENT DOCUMENTS

| | | |
|---|---|---|
| CN | 115692981 A | 2/2023 |
| CN | 115958947 A | 4/2023 |

(Continued)

OTHER PUBLICATIONS

U.S. Appl. No. 17/500,641, filed Oct. 13, 2021, Bobel et al.

(Continued)

*Primary Examiner* — Edwin A Young

(57)      ABSTRACT

A consolidated vehicle floor and a rechargeable energy storage system cover having a lower cover panel with a plurality of first structural formations including at least one of dimples and corrugations such that the lower cover panel includes upwardly protruding portions and downwardly protruding portions and an upper cover panel with second structural formations including at least one of dimples and corrugations such that the upper cover panel includes downwardly protruding portions and upwardly protruding portions, the downwardly protruding portions of the upper cover panel are secured to respective ones of the upwardly protruding portions of the lower cover panel. A vehicle floor panel with a plurality of third structural formations such that the vehicle floor panel includes downwardly protruding portions and upwardly protruding portions, the downwardly protruding portion of the vehicle floor panel are secured to respective ones of the upwardly protruding portions of the upper cover panel.

16 Claims, 5 Drawing Sheets

(56) References Cited

U.S. PATENT DOCUMENTS

| | | | |
|---|---|---|---|
| 11,549,626 | B2 | 1/2023 | Sachdev et al. |
| 11,688,910 | B2 | 6/2023 | Stephens et al. |
| 11,833,914 | B2 | 12/2023 | Collins |
| 11,939,002 | B2 | 3/2024 | Bobel et al. |
| 11,962,030 | B2 | 4/2024 | Pires et al. |
| 11,975,601 | B2 | 5/2024 | Nabuchi et al. |
| 12,083,877 | B2 | 9/2024 | Danneberg et al. |
| 12,224,451 | B2 | 2/2025 | Günther |
| 12,227,065 | B2 | 2/2025 | Janarthanam et al. |
| 12,237,476 | B2 | 2/2025 | Golm et al. |
| 12,434,717 | B2 | 10/2025 | Bobel |
| 2015/0239331 | A1 | 8/2015 | Rawlinson et al. |
| 2017/0021734 | A1 | 1/2017 | Birkholz et al. |
| 2018/0123102 | A1* | 5/2018 | Lomax ............... H01M 50/24 |
| 2018/0154754 | A1 | 6/2018 | Rowley et al. |
| 2018/0215245 | A1* | 8/2018 | Sudhindra ............ B60L 50/64 |
| 2020/0350523 | A1 | 11/2020 | Weinmann et al. |
| 2020/0373531 | A1 | 11/2020 | Dupper |
| 2022/0059894 | A1* | 2/2022 | Stephens ............... B60K 1/04 |
| 2022/0376338 | A1 | 11/2022 | Bobel et al. |
| 2023/0029479 | A1 | 2/2023 | Bobel et al. |
| 2023/0113832 | A1 | 4/2023 | Bobel et al. |
| 2023/0158878 | A1 | 5/2023 | Ota et al. |
| 2023/0299404 | A1 | 9/2023 | Bobel et al. |
| 2024/0234859 | A1 | 7/2024 | Bobel et al. |
| 2024/0308322 | A1 | 9/2024 | Harsch et al. |
| 2024/0359548 | A1 | 10/2024 | Bobel et al. |
| 2024/0363949 | A1 | 10/2024 | Bobel et al. |
| 2025/0065704 | A1 | 2/2025 | Apone et al. |

FOREIGN PATENT DOCUMENTS

| | | |
|---|---|---|
| CN | 118850185 A | 10/2024 |
| DE | 102022109383 A1 | 2/2023 |
| DE | 102022122358 A1 | 4/2023 |
| DE | 102023129860 A1 | 10/2024 |

OTHER PUBLICATIONS

U.S. Appl. No. 17/388,799, filed Jul. 29, 2021, Bobel et al.
U.S. Appl. No. 18/307,486, filed Apr. 26, 2023, Bobel et al.
U.S. Appl. No. 17/323,041, filed May 18, 2021, Bobel et al.
Bobel, Andrew Clay et al, U.S. Appl. No. 18/307,486, filed Apr. 26, 2023 entitled "Patterned Two Sheet Shear Panel Constructions," 30 pages.
Bobel, Andrew Clay et al, U.S. Appl. No. 18/307,468, filed Apr. 26, 2023 entitled "Stackable Battery Module Mounting System," 26 pages.
Bobel, Andrew C. et al, U.S. Appl. No. 17/695,070, filed Mar. 15, 2022 entitled "Battery Cell Pack," 22 pages.
Bobel, Andrew Clay et al, U.S. Appl. No. 18/356,765, filed Jul. 21, 2023 entitled "Hollow Copper Thermal Conductors," 22 pages.

* cited by examiner

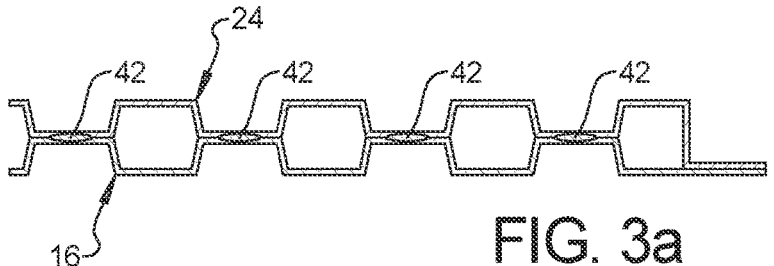
FIG. 3a
FIG. 3b
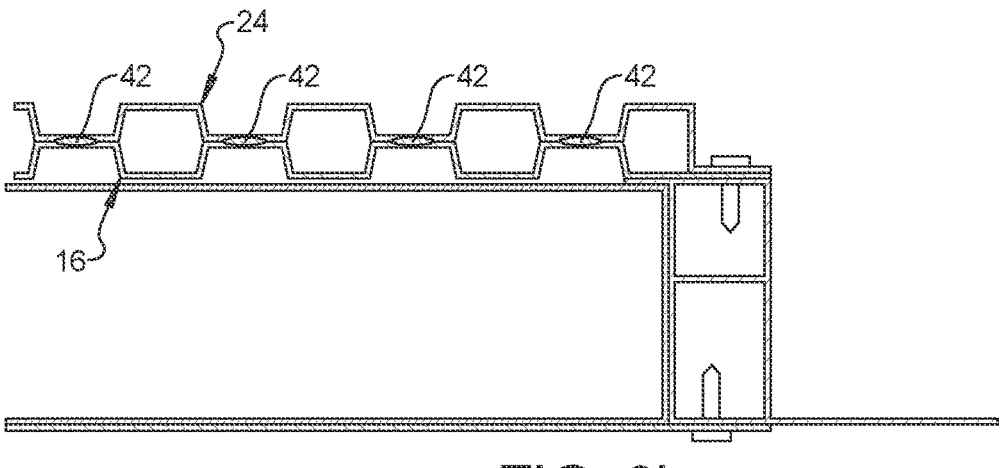
FIG. 3c

VEHICLE FLOOR CONSOLIDATION WITH A SHEAR PANEL OF A RECHARGEABLE ENERGY STORAGE SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle floor consolidation with a shear panel of a rechargeable energy storage system.

The top sheet of a rechargeable energy storage system and the vehicle floor are currently designed as two separate components, with the rechargeable energy storage system top sheet being a non-structural component that is mounted beneath the vehicle floor, which is also largely non-structural. In order to ensure a robust connection that can withstand side impact loads, the mounting strategy between these two components requires a variety of reinforcement stringers/crossmembers. This sandwiched assembly leads to a large part count with a lot of mass. The vehicle floor and rechargeable energy storage system top sheet provide no structural support and only act as sealing panels.

SUMMARY

The proposed vehicle floor consolidation with a shear panel of a rechargeable energy storage system eliminates the additional structure in the traditional mounting strategy. The purpose of the present disclosure is to implement a single structural strategy that acts as both the rechargeable energy storage system top sheet and the vehicle floor and provides all necessary seals. By incorporating a highly efficient structure directly into the rechargeable energy storage system, the rechargeable energy storage system can reduce its reliance on crossmembers and potting for structural purposes and increase its volume utilization rate.

A rechargeable energy storage system for a vehicle includes a rechargeable energy storage system housing having rechargeable battery cells therein. A structural rechargeable energy storage system cover disposed above the rechargeable energy storage system housing. The structural rechargeable energy storage system cover includes a lower cover panel with a plurality of first structural formations including at least one of dimples and corrugations such that the lower cover panel includes upwardly protruding portions and downwardly protruding portions and an upper cover panel with second structural formations including at least one of dimples and corrugations such that the upper cover panel includes downwardly protruding portions and upwardly protruding portions, the downwardly protruding portions of the upper cover panel are secured to respective ones of the upwardly protruding portions of the lower cover panel. A vehicle floor panel includes a plurality of third structural formations including at least one of dimples and corrugations such that the vehicle floor panel includes downwardly protruding portions and upwardly protruding portions, the downwardly protruding portions of the vehicle floor panel are secured to respective ones of the upwardly protruding portions of the upper cover panel.

According to a further aspect, a seat mounting structure is mounted to the upwardly protruding portions of the vehicle floor panel.

According to a further aspect, the downwardly protruding portions of the upper cover panel are secured to respective ones of the upwardly protruding portions of the lower cover panel by welds.

According to a further aspect, the upwardly protruding portions of the upper cover panel are secured to respective ones of the downwardly protruding portions of the vehicle floor panel by mechanical fasteners.

According to a further aspect, a vehicle side rail is adjacent to the rechargeable energy storage system housing, wherein the vehicle floor panel and the rechargeable energy storage system housing are connected to the vehicle side rail.

According to a further aspect, the lower cover panel and the upper cover panel each include a combination of corrugations and dimples.

According to another aspect, a rechargeable energy storage system for a vehicle includes a rechargeable energy storage system housing having rechargeable battery cells therein. A structural rechargeable energy storage system cover disposed above the rechargeable energy storage system housing, the structural rechargeable energy storage system cover panel with a plurality of first structural formations including at least one of dimples and corrugations such that the cover panel includes upwardly protruding portions and downwardly protruding portions. A vehicle floor panel with a plurality of second structural formations including at least one of dimples and corrugations such that the vehicle floor panel includes downwardly protruding portions and upwardly protruding portions, the downwardly protruding portion of the vehicle floor panel are secured to respective ones of the upwardly protruding portions of the cover panel.

According to a further aspect, a seat mounting structure is mounted to the upwardly protruding portions of the vehicle floor panel.

According to a further aspect, the upwardly protruding portions of the cover panel are secured to respective ones of the downwardly protruding portions of the vehicle floor panel by mechanical fasteners.

According to a further aspect, a vehicle side rail is adjacent to the rechargeable energy storage system housing, wherein the vehicle floor panel and the rechargeable energy storage system housing are connected to the vehicle side rail.

According to a further aspect, the floor panel and the cover panel each include a combination of corrugations and dimples.

According to another aspect, a rechargeable energy storage system for a vehicle includes a rechargeable energy storage system housing having rechargeable battery cells therein. A structural rechargeable energy storage system cover disposed above the rechargeable energy storage system housing, the structural rechargeable energy storage system cover having a lower cover panel and an upper cover panel, the upper cover panel including structural formations including at least one of dimples and corrugations such that the upper cover panel includes downwardly protruding portions and upwardly protruding portions, the downwardly protruding portions of the upper cover panel are secured to the lower cover panel. A vehicle floor includes an upper floor panel with a plurality of second structural formations including at least one of dimples and corrugations such that the upper floor panel include downwardly protruding portions and upwardly protruding portions and a lower floor panel with a plurality of second structural formations including at least one of dimples and corrugations such that the lower floor panel includes downwardly protruding portions and upwardly protruding portions, the downwardly protruding portions of the upper floor panel are secured to respective ones of the upwardly protruding portions of the lower floor panel and the upwardly protruding portions of the upper cover panel of the structural rechargeable energy storage system cover are secured to the upwardly protruding portions of the lower floor panel.

According to a further aspect, a seat mounting structure is mounted to the upwardly protruding portions of the upper floor panel.

According to a further aspect, the downwardly protruding portions of the upper cover panel are secured to the lower cover panel by welds.

According to a further aspect, the upwardly protruding portions of the upper cover panel are secured to respective ones of the upwardly protruding portions of the lower floor panel by mechanical fasteners.

According to a further aspect, a vehicle side rail adjacent to the rechargeable energy storage system housing, wherein the vehicle floor and the rechargeable energy storage system housing are connected to the vehicle side rail.

According to a further aspect, the upper floor panel and the lower floor panel each include a combination of corrugations and dimples.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3a-3c illustrate exemplary assembly steps for assembling a three layer consolidated floor panel and rechargeable energy storage system top sheet to a rechargeable energy storage system and rocker panel according to an alternative embodiment of the present disclosure;

FIG. 5a is a schematic cross-sectional view of a four layer consolidated floor panel and rechargeable energy storage system top sheet assembled to a rechargeable energy storage system and rocker panel according to the principles of the present disclosure;

FIG. 5b is a detailed view of FIG. 5a;

In the drawings, reference numbers may be reused to identify similar and/or identical elements.

DETAILED DESCRIPTION

Figure 1:
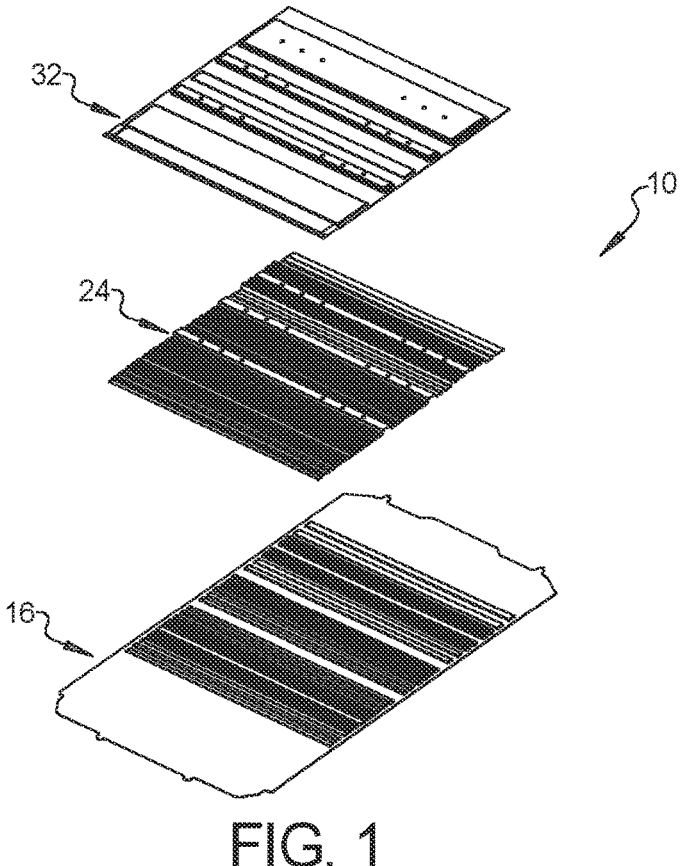
FIG. 1 is an exploded perspective view of a three layer consolidated floor panel and rechargeable energy storage system top sheet according to the principles of the present disclosure.
Figure 2:
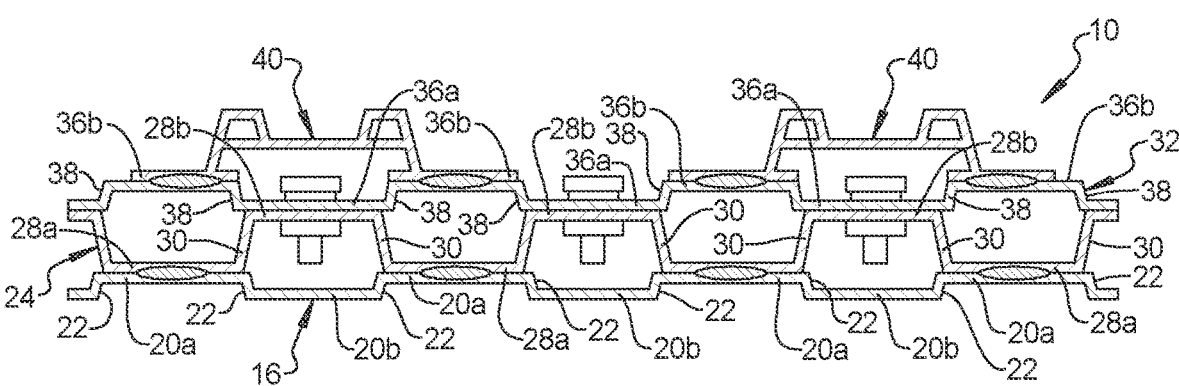
FIG. 2 is a cross-sectional view of a three layer consolidated floor panel and rechargeable energy storage system top sheet according to the principles of the present disclosure.

With reference to FIGS. 1-3, a consolidated vehicle floor and a rechargeable energy storage system cover 10 will now be described. A rechargeable energy storage system 12, best shown in FIGS. 3b and 3c, includes a housing 14 that can include a plurality of battery cells therein. The housing 14 is enclosed and sealed by the consolidated vehicle floor and a rechargeable energy storage system cover 10. With reference to FIG. 2, the consolidated vehicle floor and a rechargeable energy storage system cover 10 includes a lower cover panel 16 with a plurality of structural formations including at least one of dimples and corrugations such that the lower cover panel 16 includes upwardly protruding portions 20a and downwardly protruding portions 20b with sloped sidewalls 22 extending vertically therebetween. An upper cover panel 24 includes further structural formations including at least one of dimples and corrugations such that the upper cover panel 24 includes downwardly protruding portions 28a and upwardly protruding portions 28b with sloped sidewalls 30 extending vertically therebetween. The downwardly protruding portions 28a of the upper cover panel 24 are secured to respective ones of the upwardly protruding portions 20a of the lower cover panel 16.

A vehicle floor panel 32 includes a plurality of structural formations including at least one of dimples and corrugations such that the vehicle floor panel 32 includes downwardly protruding portions 36a and upwardly protruding portions 36b with sloped sidewalls 38 extending vertically therebetween. The downwardly protruding portions 36a of the vehicle floor panel 32 are secured to respective ones of the upwardly protruding portions 28b of the upper cover panel 24.

Figures 6A, 6B, 6C, 6D, 7:
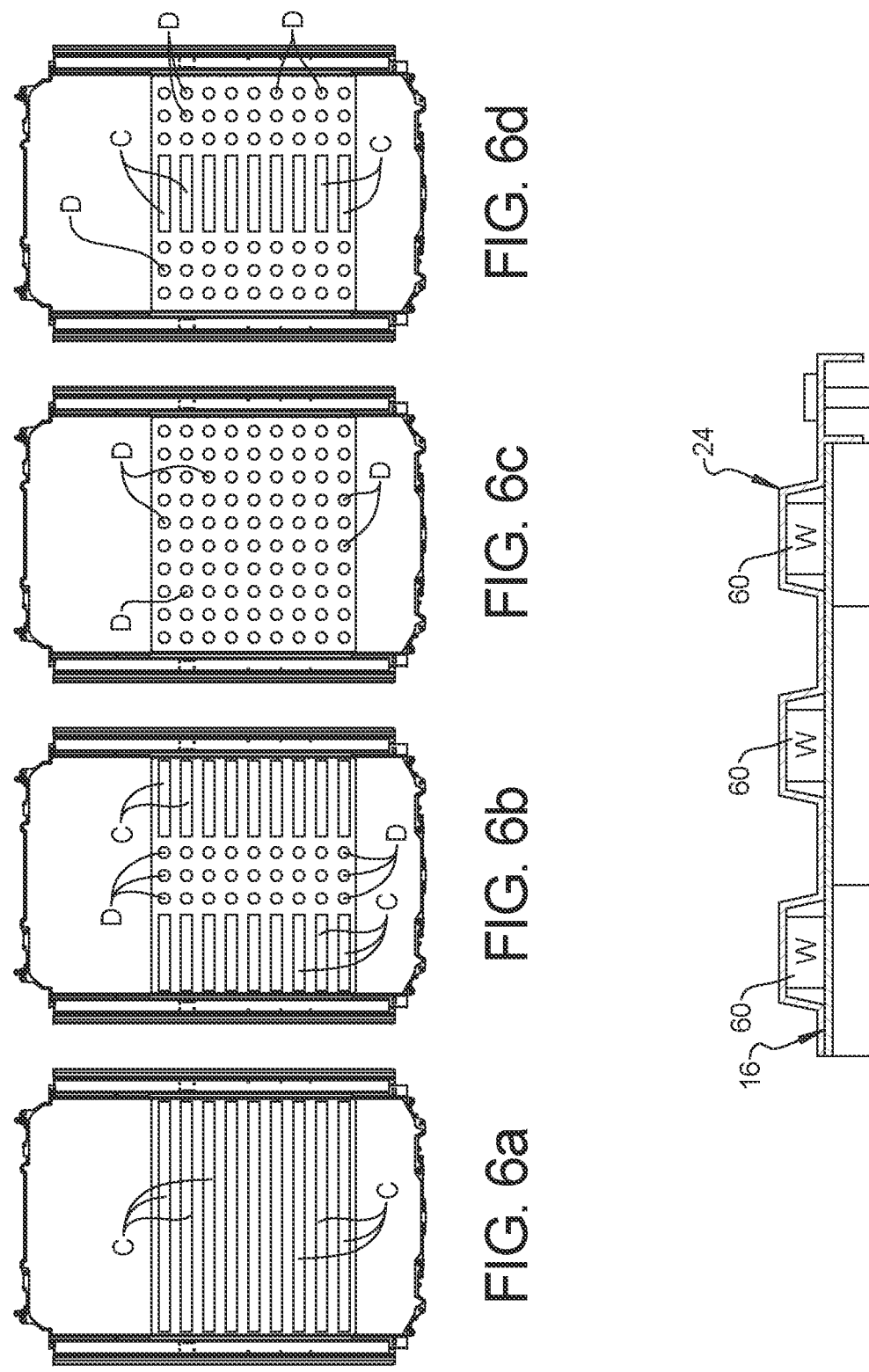
FIGS. 6a-6d illustrate alternative fastening and reinforcement arrangements for assembling the layers of the consolidated floor panel and rechargeable energy storage system top sheet according to the principles of the present disclosure.
FIG. 7 is a schematic view of a liquid cooled consolidated floor panel and rechargeable energy storage system top sheet according to the principles of the present disclosure.

The structural formations of the lower cover panel 16, upper cover panel 24 and the vehicle floor panel 32 can include different forms including corrugations and dimples and combinations thereof. FIG. 6a illustrates the structural formations all including elongated corrugations C. FIG. 6b illustrates the structural formations as including laterally outward corrugations C and centrally disposed dimples D. FIG. 6c illustrates the structural formations all including elongated spaced dimples D. FIG. 6d illustrates the structural formations as including laterally outward dimples D and centrally disposed corrugations C. It is noted that the dimples D can have various shapes including, but not limited to circular, oval, and polygonal.

With reference to FIG. 2, one or more seat mounting structure 40 is mounted to the upwardly protruding portions 36b of the vehicle floor panel 32. The seat mounting structures 40 are designed as crossmembers that extend laterally across the vehicle floor panel 32 and the vehicle seats can be mounted to the seat mounting structures 40.

With reference to FIGS. 3a-3c, the assembly of the consolidated vehicle floor and a rechargeable energy storage system cover 10 will now be described. FIG. 3a shows the downwardly protruding portions 28a of the upper cover panel 24 can be secured to respective ones of the upwardly protruding portions 20a of the lower cover panel 16 by spot welds 42. FIG. 3*b* shows the upper cover panel 24 and the lower cover panel 16 being sealingly connected to the housing 14 of the rechargeable energy storage system 12 by mechanical fasteners 44. FIG. 3*c* shows the downwardly protruding portions 36*a* of the vehicle floor panel 32 can be secured to respective ones of the upwardly protruding portions 28*b* of the upper cover panel 24 by mechanical fasteners or an adhesive 44. With reference to FIG. 3*c*, a vehicle side rail 46 is adjacent to the rechargeable energy storage system housing 14. The vehicle floor panel 32 is connected to a flange 48 of the vehicle side rail 46 by a welded connection 50. The rechargeable energy storage system housing 14 is connected to the vehicle side rail 46 by a mounting bracket 52 that can be connected to the housing 14 and the vehicle side rail 46 by mechanical fasteners or an adhesive 54.

Figure 4A:
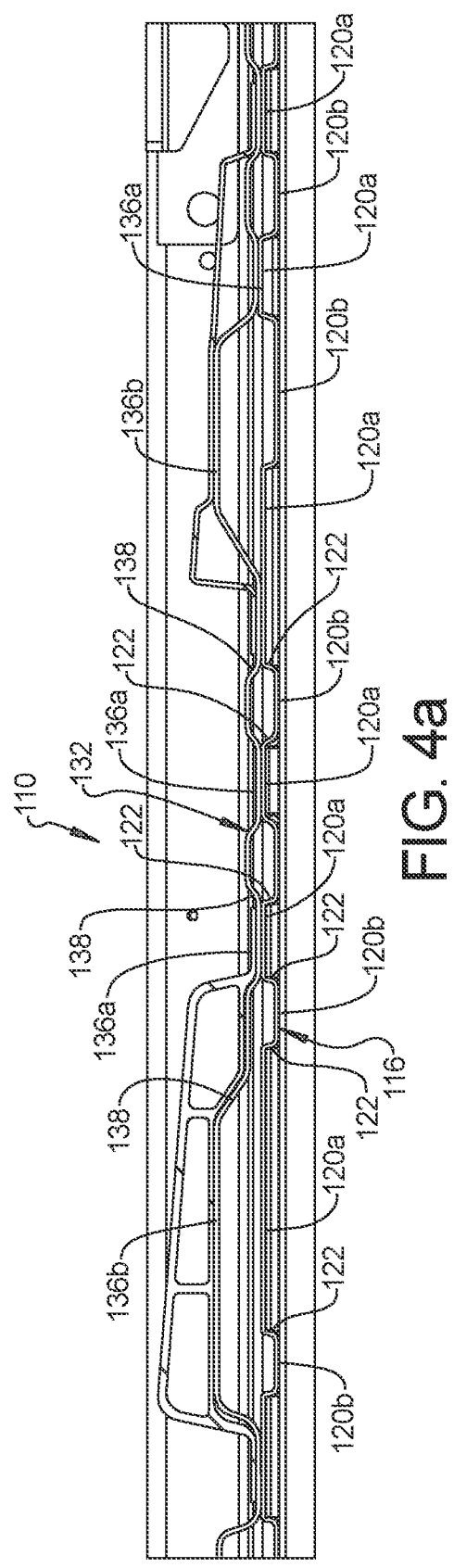
FIG. 4a is a cross-sectional view of a two layer consolidated floor panel and rechargeable energy storage system top sheet according to the principles of the present disclosure.
Figure 4B:
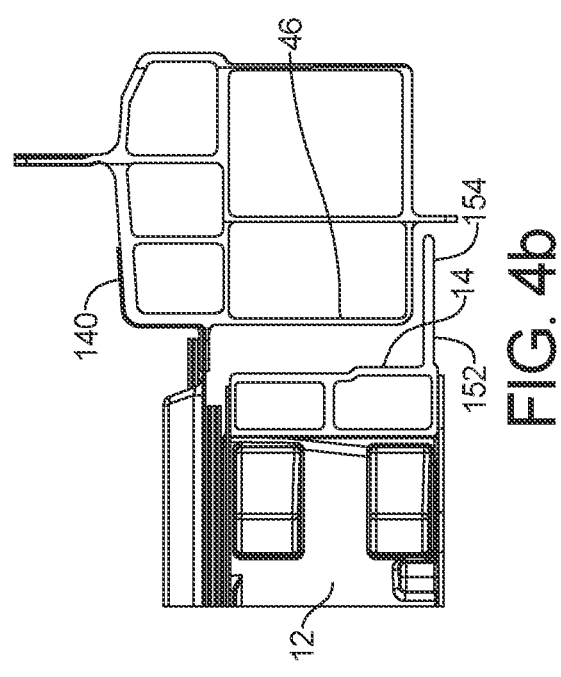
FIG. 4b is a schematic cross-sectional view of the two layer consolidated floor panel and rechargeable energy storage system top sheet assembled to a rechargeable energy storage system and rocker panel according to the principles of the present disclosure.

With reference to FIGS. 4*a* and 4*b*, a two-panel consolidated vehicle floor and a rechargeable energy storage system cover 110 will now be described. As shown in FIG. 4*a*, the consolidated vehicle floor and a rechargeable energy storage system cover 110 for mounting to a housing 14 of a rechargeable energy storage system 12 includes a cover panel 116 with a plurality of structural formations including at least one of dimples and corrugations such that the cover panel 116 includes upwardly protruding portions 120*a* and downwardly protruding portions 120*b* with sloped sidewalls 122 extending vertically therebetween. A vehicle floor panel 132 includes a plurality of structural formations including at least one of dimples and corrugations such that the vehicle floor panel 132 includes downwardly protruding portions 136*a* and upwardly protruding portions 136*b* with sloped sidewalls 138 extending vertically therebetween. The downwardly protruding portions 136*a* of the vehicle floor panel 132 are secured to respective ones of the upwardly protruding portions 120*a* of the cover panel 116. With reference to FIG. 4*b*, a vehicle side rail 46 is adjacent to the rechargeable energy storage system housing 14. The vehicle floor panel 132 is connected via a welded or fastener connection 140 to the vehicle side rail 46 directly or by a bracket. The rechargeable energy storage system housing 14 is also connected to the vehicle side rail 46 by a mounting bracket 152 that can be connected to the housing 14 and the vehicle side rail 46 by mechanical fasteners or an adhesive 154.

The structural formations of the cover panel 16 and the vehicle floor panel 132 can include different forms including corrugations and dimples and combinations thereof as discussed with reference to FIGS. 6*a*-6*d*.

Figures 5A, 5B:
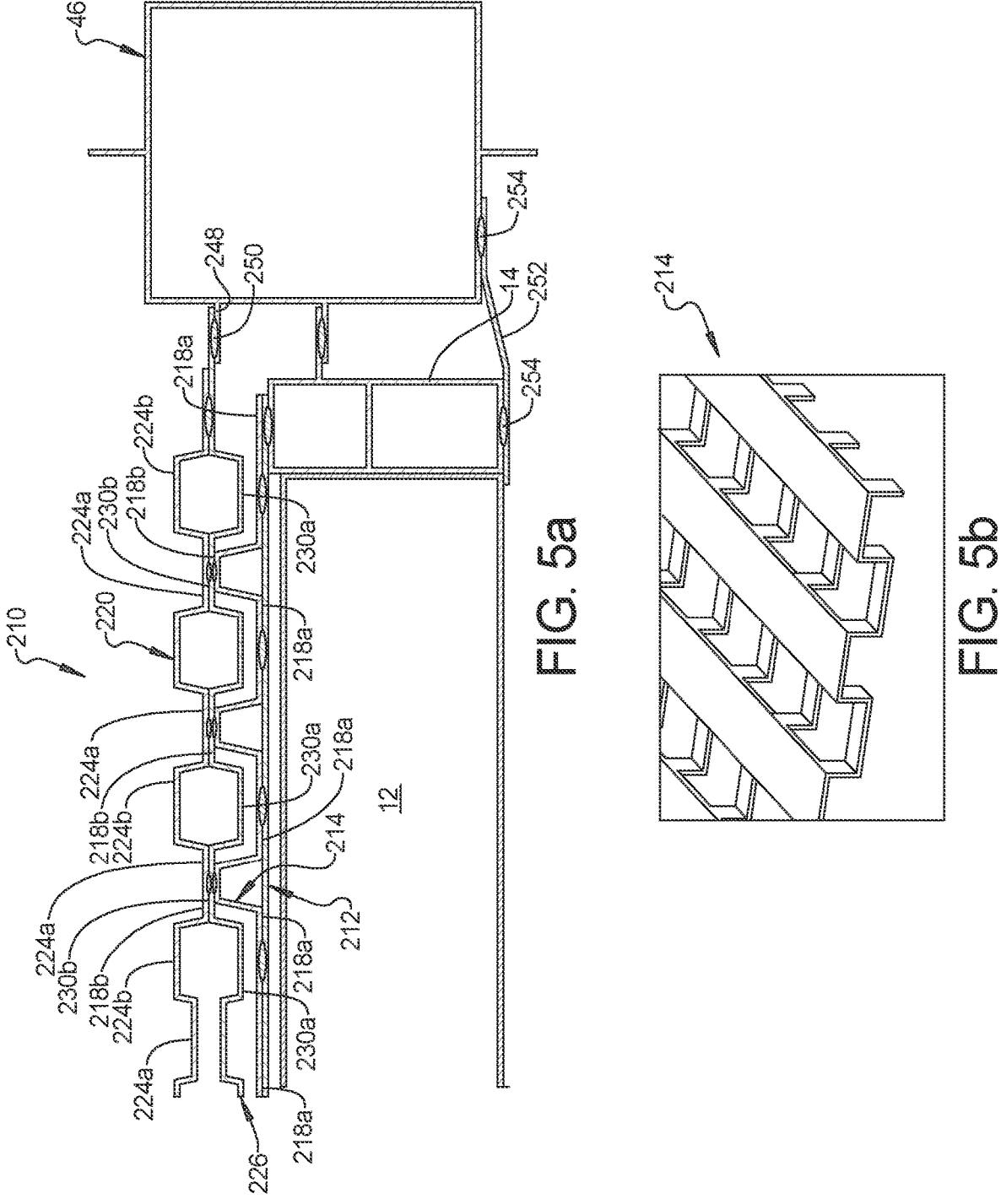

With reference to FIG. 5*a*, an alternative four-panel consolidated vehicle floor and a rechargeable energy storage system cover 210 for mounting to a housing 14 of a rechargeable energy storage system 12 will now be described. The structural rechargeable energy storage system cover 210 includes a lower cover panel 212 and an upper cover panel 214. The upper cover panel 214 includes structural formations including at least one of dimples and corrugations such that the upper cover panel 214 includes downwardly protruding portions 218*a* and upwardly protruding portions 218*b*. The upper cover panel 214 can include cutouts to have a lattice structure as shown in FIG. 5*b*. The lattice structure has a reduced weight. The downwardly protruding portions 218*a* of the upper cover panel 214 are secured to the lower cover panel 212. The vehicle floor includes an upper floor panel 220 with a plurality of second structural formations including at least one of dimples and corrugations such that the upper floor panel 220 includes downwardly protruding portions 224*a* and upwardly protruding portions 224*b* and a lower floor panel

226 with a plurality of second structural formations including at least one of dimples and corrugations such that the lower floor panel includes downwardly protruding portions 230*a* and upwardly protruding portions 230*b*. The downwardly protruding portions 230*b* of the upper floor panel are secured to respective ones of the upwardly protruding portions 230*b* of the lower floor panel 226 and the upwardly protruding portions 218*b* of the upper cover panel 214 are secured to the upwardly protruding portions 230*a* of the lower floor panel 226. One of the upper and lower vehicle floor panels 220, 226 are connected to a flange 248 of the vehicle side rail 46 by a welded connection 250. The rechargeable energy storage system housing 14 is connected to the vehicle side rail 46 by a mounting bracket 252 that can be connected to the housing 14 and the vehicle side rail 46 by mechanical fasteners or an adhesive 254.

With reference to FIG. 7 exemplary water cooling channels 60 can be nested beneath patterns on the panels 16, 24, 32 of the consolidated vehicle floor and a rechargeable energy storage system cover 10, 110, 210.

The consolidated vehicle floor and a rechargeable energy storage system cover 10, 110, 210 of the present disclosure minimizes reliance on floor crossmembers and crossmembers/potting for structure and increases volume utilization rate of the battery pack. The design prevents buckling in RESS cover without doublers.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A rechargeable energy storage system for a vehicle, comprising:

a rechargeable energy storage system housing having rechargeable battery cells therein;

a structural rechargeable energy storage system cover disposed above the rechargeable energy storage system housing, the structural rechargeable energy storage system cover having a lower cover panel with a plurality of first structural formations including at least one of dimples and corrugations such that the lower cover panel includes upwardly protruding portions and downwardly protruding portions and an upper cover panel with second structural formations including at least one of dimples and corrugations such that the upper cover panel includes downwardly protruding portions and upwardly protruding portions, the downwardly protruding portions of the upper cover panel are secured to respective ones of the upwardly protruding portions of the lower cover panel;

a vehicle floor panel with a plurality of third structural formations including at least one of dimples and corrugations that include downwardly protruding portions and upwardly protruding portions, the downwardly protruding portion of the vehicle floor panel are secured to respective ones of the upwardly protruding portions of the upper cover panel.

2. The rechargeable energy storage system for a vehicle according to claim 1, further comprising a seat mounting structure mounted to the upwardly protruding portions of the vehicle floor panel.

3. The rechargeable energy storage system for a vehicle according to claim 1, wherein the downwardly protruding portions of the upper cover panel are secured to respective ones of the upwardly protruding portions of the lower cover panel by welds.

4. The rechargeable energy storage system for a vehicle according to claim 3, wherein the upwardly protruding portions of the upper cover panel are secured to respective ones of the downwardly protruding portions of the vehicle floor panel by mechanical fasteners.

5. The rechargeable energy storage system for a vehicle according to claim 1, wherein the upwardly protruding portions of the upper cover panel are secured to respective ones of the downwardly protruding portions of the vehicle floor panel by mechanical fasteners.

6. The rechargeable energy storage system for a vehicle according to claim 1, further comprising a vehicle side rail adjacent to the rechargeable energy storage system housing, wherein the vehicle floor panel and the rechargeable energy storage system housing are connected to the vehicle side rail.

7. The rechargeable energy storage system for a vehicle according to claim 1, wherein the lower cover panel and the upper cover panel each include a combination of corrugations and dimples.

8. A rechargeable energy storage system for a vehicle, comprising:

a rechargeable energy storage system housing having rechargeable battery cells therein;

a structural rechargeable energy storage system cover panel disposed above the rechargeable energy storage system housing, the structural rechargeable energy storage system cover panel with a plurality of first structural formations including at least one of dimples and corrugations such that the cover panel includes upwardly protruding portions and downwardly protruding portions;

a vehicle floor panel with a plurality of second structural formations including at least one of dimples and corrugations such that the vehicle floor panel includes downwardly protruding portions and upwardly protruding portions, the downwardly protruding portions of the vehicle floor panel are secured to respective ones of the upwardly protruding portions of the cover panel; and further comprising a seat mounting structure mounted to the upwardly protruding portions of the vehicle floor panel.

9. The rechargeable energy storage system for a vehicle according to claim 8, further comprising a vehicle side rail adjacent to the rechargeable energy storage system housing, wherein the vehicle floor panel and the rechargeable energy storage system housing are connected to the vehicle side rail.

10. A rechargeable energy storage system for a vehicle, comprising:

a rechargeable energy storage system housing having rechargeable battery cells therein;

a structural rechargeable energy storage system cover disposed above the rechargeable energy storage system housing, the structural rechargeable energy storage system cover having a lower cover panel and an upper cover panel, the upper cover panel including structural formations including at least one of dimples and corrugations such that the upper cover panel includes downwardly protruding portions and upwardly protruding portions, the downwardly protruding portions of the upper cover panel are secured to the lower cover panel; and a vehicle floor including an upper floor panel with a plurality of second structural formations including at least one of dimples and corrugations such that the upper floor panel includes downwardly protruding portions and upwardly protruding portions and a lower floor panel with a plurality of second structural formations including at least one of dimples and corrugations such that the lower floor panel includes downwardly protruding portions and upwardly protruding portions, the downwardly protruding portions of the upper floor panel are secured to respective ones of the upwardly protruding portions of the lower floor panel and the upwardly protruding portions of the upper cover panel of the structural rechargeable energy storage system cover are secured to the upwardly protruding portions of the lower floor panel.

11. The rechargeable energy storage system for a vehicle according to claim 10, further comprising a seat mounting structure mounted to the upwardly protruding portions of the upper floor panel.

12. The rechargeable energy storage system for a vehicle according to claim 10, wherein the downwardly protruding portions of the upper cover panel are secured to the lower cover panel by welds.

13. The rechargeable energy storage system for a vehicle according to claim 12, wherein the upwardly protruding portions of the upper cover panel are secured to respective ones of the upwardly protruding portions of the lower floor panel by mechanical fasteners.

14. The rechargeable energy storage system for a vehicle according to claim 10, wherein the upwardly protruding portions of the upper cover panel are secured to respective ones of the upwardly protruding portions of the lower floor panel by mechanical fasteners.

15. The rechargeable energy storage system for a vehicle according to claim 10, further comprising a vehicle side rail adjacent to the rechargeable energy storage system housing, wherein the vehicle floor and the rechargeable energy storage system housing are connected to the vehicle side rail.

16. The rechargeable energy storage system for a vehicle according to claim 10, wherein the upper floor panel and the lower floor panel each include a combination of corrugations and dimples.

\* \* \* \* \*